United States Patent [19]

Orphanides

[11] Patent Number: 4,605,589
[45] Date of Patent: Aug. 12, 1986

[54] VINYL ACETATE-ETHYLENE COPOLYMER BINDER EMULSIONS FOR MEDICAL-SURGICAL NONWOVEN FABRICS

[75] Inventor: Gus G. Orphanides, Allentown, Pa.

[73] Assignee: Air Products and Chemicals, Inc., Allentown, Pa.

[21] Appl. No.: 664,816

[22] Filed: Oct. 25, 1984

[51] Int. Cl.$^4$ .................... C08L 23/08; C08L 31/04; C08L 29/04

[52] U.S. Cl. .................... 428/290; 428/288; 525/59; 524/503; 524/533; 524/557; 524/563

[58] Field of Search .................... 428/290; 525/59; 524/503

[56] References Cited

U.S. PATENT DOCUMENTS

| | | | |
|---|---|---|---|
| 3,094,500 | 6/1963 | Sedman | 260/29.6 |
| 3,380,851 | 4/1968 | Lindemann | 526/304 |
| 3,661,696 | 5/1972 | Knutson | 161/204 |
| 3,692,723 | 9/1972 | Kasagi et al. | 260/29.6 |
| 3,734,819 | 5/1973 | Knutson | 161/254 |
| 3,769,151 | 10/1973 | Knutson et al. | 161/204 |
| 4,043,961 | 8/1977 | Beresniewicz et al. | 260/29.6 |
| 4,075,387 | 2/1978 | Trapasso et al. | 428/288 |
| 4,118,357 | 10/1978 | Brabetz et al. | 260/29.6 |
| 4,133,791 | 1/1979 | Kemenater | 260/29.6 |
| 4,332,850 | 6/1982 | Iacoviello | 428/288 |
| 4,481,250 | 11/1984 | Cook et al. | 428/290 |
| 4,535,013 | 8/1985 | Kuhn | 429/290 |

Primary Examiner—Carman J. Seccuro
Attorney, Agent, or Firm—Michael Leach; James C. Simmons; E. Eugene Innis

[57] ABSTRACT

A vinyl acetate-ethylene copolymer binder emulsion prepared by the copolymerization of vinyl acetate and ethylene in the presence of a polyvinyl alcohol which is 50 to 99 mole % hydrolyzed and has a 100 to 375 degree of polymerization such that it demonstrates a viscosity of about 2.4 to 4 as a 4% aqueous solution at 20° C. Nonwoven fabrics bond with such copolymers possess surprisingly improved softness while maintaining toughness.

22 Claims, No Drawings

VINYL ACETATE-ETHYLENE COPOLYMER BINDER EMULSIONS FOR MEDICAL-SURGICAL NONWOVEN FABRICS

TECHNICAL FIELD

The present invention relates to binder compositions for nonwoven fabrics comprising copolymerized ethylene and vinyl acetate.

BACKGROUND OF THE INVENTION

The key performance criteria for nonwoven binders in medical-surgical fabrics include the ability to impart softness, or "hand", toughness, tear strength, compatibility with fluorocarbon additives which are used to enhance water repellency and cationic additives for antimicrobial activity, resistance to fabric blocking and low levels of free formaldehyde.

The current classes of polymer emulsion binders used in medical-surgical fabrics are based on flexible polymers like acrylates. Fabric softness correlates with the low glass transition temperature of the polymer. Toughness is enhanced by the incorporation of functional monomers that crosslink under garment fabrication.

Vinylacetate-ethylene copolymer emulsion binders of the prior art have not imparted a balance of softness and toughness for medical-surgical garments. Softness, or "hand", is the assessment of fabric feel via the sense of touch. Fabric softness and toughness are dependent on a combination of the chemical structure of the polymer binder and the type of stabilizer used in the emulsion polymerization. Vinyl acetate-ethylene copolymer emulsions are best stabilized by protective colloids and nonionic emulsifiers such as partially hydrolyzed polyvinyl alcohol, cellulosics, and alkylphenoxy polyalkoxy alcohols. These stabilizers also offer the required compatibility with the cationic additives.

In the case of polymer structure, attempts have been made to match the softness needs by maximizing the level of ethylene in the copolymer with vinyl acetate to lower the glass transition temperature ($T_g$). This has improved the softness performance, but the stabilizer type has a contributory effect that either sacrifices the softness to gain toughness as in the case for polyvinyl alcohol or sacrifices toughness to maintain softness as in the case for cellulosics and alkylphenoxy polyalkoxy alcohols.

Thus, the industry has not accepted the use of a vinyl acetate-ethylene copolymer emulsion as a nonwoven binder for medical-surgical fabrics.

U.S. Pat. No. 3,094,500 discloses the emulsion homopolymerization of vinyl ester monomers in the presence of critical amounts of at least 10% of a low molecular weight 70-90% hydrolyzed polyvinyl ester having a viscosity of 1.2 to 3.0 centipoises for a 4% aqueous solution at 20° C. The emulsions of the vinyl ester homopolymers produce films which are stated as having excellent remoistenability, clarity and gloss.

U.S. Pat. No. 3,692,723 discloses the aqueous dispersions of ethylene and vinyl acetate copolymers prepared by a copolymerization process utilizing a particular combination of nonionic emulsifier, anionic emulsifier and at least one high molecular weight protective colloid which may be a polyvinyl alcohol having a degree of polymerization of 400-2000 and containing 5 to 15% by weight of residual acetic acid groups.

U.S. Pat. Nos. 3,661,696; 3,734,819; and 3,769,151 disclose the copolymerization of ethylene and vinyl acetate in the presence of a preformed seed emulsion and a minor amount of a protective colloid comprising a mixture of fully and partially hydrolyzed polyvinyl acetate. Suitable fully and partially hydrolyzed polyvinyl acetates are described as having a viscosity of 5-125 centipoises and 2-80 centipoises, respectively, as 4% aqueous solutions at 20° C.

U.S. Pat. No. 4,118,357 discloses an aqueous dispersion of a pre-crosslinked polyvinyl ester grafted onto polyvinyl alcohol.

U.S. Pat. No. 4,133,791 discloses preparation of an aqueous ethylene-containing copolymer dispersion prepared in the presence of from 1-15% by weight of polyvinyl alcohol with a degree of hydrolyzation of 70-100%.

U.S. Pat. No. 4,043,961 discloses an aqueous emulsion of vinyl acetate-ethylene copolymer prepared in the presence of protective colloid comprising fully hydrolyzed vinyl alcohol copolymer containing methyl methacrylate.

SUMMARY OF THE INVENTION

The present invention provides an aqueous dispersion of vinyl acetate-ethylene copolymers of 35 to 65 wt % solids which are useful as nonwoven binders for making medical-surgical fabrics. The aqueous dispersion, or emulsion, comprises a vinyl acetate-ethylene copolymer which is 20 to 50 wt % ethylene. The copolymer is dispersed in an aqueous medium prepared by the emulsion copolymerization of vinyl acetate and ethylene monomers in the presence of a stabilizing amount of a low molecular weight polyvinyl alcohol which is 50 to 99 mole % hydrolyzed and has an average degree of polymerization of 100 to 375 such that its viscosity in a 4% aqueous solution at 20° C. ranges from about 2.4 to 4 cps.

The use of the polyvinyl alcohol with the designated degree of polymerization affords a low pre-emulsion viscosity which extends through the polymerization and provides for homogeneous ethylene comonomer distribution during copolymerization with the vinyl acetate. In addition, the low molecular weight polyvinyl alcohol may contribute more flexibilty to the copolymer-polyvinyl alcohol graft network. It is believed that these two factors increase softness while maintaining the toughness properties of polyvinyl alcohol stabilized polymers which are strengthened by intermolecular hydrogen-bonding.

Thus the invention provides enhanced softness through the use of a low molecular weight polyvinyl alcohol relative to higher molecular weight polyvinyl alcohol for a vinyl acetate-ethylene copolymer with 20-50 wt % incorporated ethylene. Toughness is imparted to the bonded nonwoven fabric by hydrogen bonding from the polyvinyl alcohol rather than crosslinking by a functional monomer.

As other advantages, the copolymer emulsion binders of the invention have excellent mechanical stability and are compatible with a wide variety of additives such as fluorocarbons and extenders used to enhance water repellency in the finished fabric and cationic antimicrobial additives. In addition, these emulsion binders offer resistance to fiber blocking at low levels of formaldehyde.

DETAILED DESCRIPTION OF THE INVENTION

Methods for preparing vinyl acetate-ethylene copolymer emulsions are well known in the art and any of the customary procedures can be used. The copolymers according to the invention comprise 50 to 80 wt % vinyl acetate and 20 to 50 wt % ethylene to provide a $T_g$ ranging from about $-10°$ to $-35°$ C., preferably 60 to 70 wt % vinyl acetate and 30 to 40 wt % ethylene, on a monomer basis.

The vinyl acetate-ethylene copolymers may optionally include one or more additional ethylenically unsaturated copolymerizable monomers. Exemplary of such comonomers, which may be present at up to 10 wt % or more, are $C_3$-$C_{10}$ alkenoic acids, such as acrylic acid, methacrylic acid, crotonic acid and isocrotonic acid and their esters with $C_1$-$C_{18}$ alkanols, such as methanol, ethanol, propanol, butanol and 2-ethylhexanol; vinyl halides such as vinyl chloride; alpha,beta-unsaturated $C_4$-$C_{10}$ alkenedioic acids such as maleic acid, fumaric acid and itaconic acid and their monoesters and diesters with the same $C_1$-$C_{18}$ alkanols; and nitrogen containing monoolefinically unsaturated monomers, particularly nitriles, amides, N-methylol amides, lower alkanoic acid esters of N-methylol amides, lower alkyl ethers of N-methylol amides and allylcarbamates, such as acrylonitrile, acrylamide, methacrylamide, N-methylol acrylamide, N-methylol methacrylamide, lower alkyl ethers or lower alkanoic acid esters of N-methylol acrylamide, N-methylol methacrylamide and N-methylol allylcarbamate. If such additional ethylenically unsaturated comonomer is used, about 2-5 wt % is preferred.

Contemplated as the functional, or operative, equivalents of vinyl acetate in the copolymer emulsions are vinyl esters of $C_1$-$C_{18}$ alkanoic acids, such as vinyl formate, vinyl propionate, vinyl laurate and the like.

The polyvinyl alcohol which is used as the stabilizing system for the copolymerization reaction to prepare the copolymer emulsion binders is 50 to 99 mole % hydrolyzed, preferably 85 to 90 and especially 87 to 89 mole % hydrolyzed, and has a degree of polymerization ranging from 100 to 375, preferably, 185 to 255. Another means for assessing the degree of polymerization of the polyvinyl alcohol is its viscosity as a 4 wt % aqueous solution at 20° C. Suitable polyvinyl alcohols would have a viscosity ranging from 2.4 to 4, preferably 2.8 to 3.2. Such polyvinyl alcohols can be prepared by synthesis and saponification techniques well known to those skilled in the art of manufacturing polyvinyl alcohol. Such a polyvinyl alcohol is marketed by Air Products and Chemicals, Inc. under the trademark VINOL ® 203.

The amounts of such polyvinyl alcohol stabilizer used in the polymerization reaction is that amount typically added as the protective colloid in such vinyl acetate-ethylene copolymerization recipes, i.e. a stabilizingly effective amount, for example about 3 to 10% based on the weight of vinyl acetate. The polyvinyl alcohol is added to the polymerization reaction medium all at once prior to initiation or incrementally during the course of the polymerization, provided a sufficient amount is present initially to provide emulsion stability.

In addition to the polyvinyl alcohol stabilizer, emulsifying agents and protective colloids well known in the polymerization art may also be added in low levels, for example to enhance stability. Suitable emulsifying agents would include polyoxyalkylene condensates; suitable protective colloids would include hydroxyalkyl celluloses.

Various free-radical forming sources can be used in carrying out the polymerization of the monomers, such as peroxide compounds. Combination-type systems employing both reducing agents and oxidizing agents can also be used, i.e. a redox system. Suitable reducing agents, or activators, include bisulfites, sulfoxylates, alkali metal bisulfite-ketone adducts, or other compounds having reducing properties such as ascorbic acid erythorbic acid and other reducing sugars. The oxidizing agents include hydrogen peroxide, organic peroxides such as t-butyl hydroperoxide and the like, persulfates, such as ammonium or potassium persulfate, and the like. Specific redox systems which can be used include hydrogen peroxide and zinc formaldehyde sulfoxylate; hydrogen peroxide and erythorbic acid; hydrogen peroxide, ammonium persulfate or potassium persulfate with sodium metabisulfite, sodium bisulfite, ferrous sulfate, zinc formaldehyde sulfoxylate or sodium formaldehyde sulfoxylate; t-butyl hydroperoxide with sodium bisulfite-acetone adduct. Other free radical forming systems that are well known in the art can also be used to polymerize the monomers.

The oxidizing agent is generally employed in an amount of 0.01 to 1%, preferably 0.05 to 0.5% based on the weight of the vinyl acetate introduced into the polymerization system. The reducing agent is ordinarily added in the necessary equivalent amount.

In general, suitable vinyl acetate-ethylene copolymer emulsions can be prepared by the copolymerization of the monomers in the presence of the polyvinyl alcohol stabilizer in an aqueous medium under pressures generally not exceeding about 100 atm and in the presence of a redox system which is added incrementally, the aqueous system being maintained by a suitable buffering agent at a pH of about 2 to 6. The process first involves a homogenization in which the vinyl acetate suspended in water is thoroughly agitated in the presence of ethylene under the working pressure to effect solution of the ethylene in the vinyl acetate while the reaction medium is gradually heated to polymerization temperature. The homogenization period is followed by a polymerization period during which the redox system is added incrementally.

The reaction temperature can be controlled by the rate of redox addition and by the rate of heat dissipation via a reaction vessel water jacket. Generally, it is advantageous to maintain a mean temperature of about 50° C. during the polymerization of the monomers and to avoid temperatures much in excess of 80° C. While temperatures as low as 0° can be used, economically the lower temperature limit is about 30°.

The reaction time will depend upon variables such as the temperature, the free radical forming source and the desired extent of polymerization. It is generally desirable to continue with the reaction until less than 0.5% of the vinyl acetate remains unreacted.

In carrying out the polymerization, an amount of the vinyl acetate is initially charged to the polymerization vessel and saturated with ethylene. Most advantageously, at least about 10%, preferably about 25%, of the total vinyl acetate to be polymerized is initially charged and the remainder of the vinyl acetate is added incrementally during the polymerization. The charging of all the vinyl acetate initially is also contemplated with no additional incremental supply.

When reference is made to incremental addition, whether of vinyl acetate or redox system or any other ingredient, substantially uniform additions, both with respect to quantity and time, are contemplated. Such additions are also referred to as "delay" additions.

The quantity of ethylene entering into the copolymer is influenced by the pressure, the agitation and the viscosity of the polymerization medium. Thus, to increase the ethylene content of the copolymer higher pressures, greater agitation and a low viscosity are employed.

The process of forming the vinyl acetate-ethylene copolymer emulsion generally comprises the preparation of an aqueous solution containing the polyvinyl alcohol stabilizer and, optionally, the pH buffering system. This aqueous solution and the initial or total charge of the vinyl acetate are added to the polymerization vessel and ethylene pressure is applied to the desired value. The pressurized ethylene source can be shut off from the reactor so that the ethylene pressure decays as it is polymerized or it can be kept open to maintain the ethylene pressure throughout the reaction, i.e. make-up ethylene. As previously mentioned, the mixture is thoroughly agitated to dissolve ethylene in the vinyl acetate and in the water phase. Conveniently, the charge is brought to polymerization temperature during this agitation period. The polymerization is then initiated by introducing initial amounts of either the oxidant or the reductant, the other having been added with the initial charge. After the polymerization has started, the oxidant and reductant are incrementally added as required to continue polymerization. Any third copolymerizable monomer and the remaining vinyl acetate, if any, may be added as separate delays.

As mentioned, the reaction is generally continued until the residual vinyl acetate content is below about 0.5%. The completed reaction product is then allowed to cool to about room temperature while sealed from the atmosphere. The pH is then suitably adjusted to a value in the range of 4.5-7, preferably 4.5-5, to insure maximum stability.

Vinyl acetate-ethylene copolymer emulsions of relatively high solids content can be directly produced having a solids content of 40-60%. They can, of course, be easily thinned by the addition of water to a lower solids content of any desired value.

Another method for producing vinyl acetate-ethylene copolymer emulsions comprises first forming an aqueous emulsion of vinyl acetate and polyvinyl alcohol stabilizer in a reactor. The reactor is initially pressurized with ethylene to an ethylene-equilibrium pressure of about 200-500 psig. The resulting reaction mixture is adjusted to a temperature from about 10°-30° C. Polymerization is initiated by the addition of a free radical source at a rate such that the reaction mixture is brought to a temperature of 45°-85° C., preferably 50°-70° C., within a period of one hour or less, preferably about 30 mins and ethylene pressure is increased to about 100 atm. The polymerization is continued as described previously until the vinyl acetate content is reduced below about 0.7 wt % of the copolymer.

This type of polymerization process is described in U.S. Pat. No. 4,332,850 which is incorporated by reference.

The vinyl acetate-ethylene copolymer binders of the invention can be used to prepare nonwoven products, or fabrics, by a variety of methods known in the art which, in general, involve the impregnation of a loosely assembled mass of fibers with the binder latex, followed by a moderate heating to dry the mass.

In the case of the prior art vinyl acetate-ethylene binders, this moderate heating also served to cure the binder by forming a cross-linked interpolymer via the N-methylol functionality usually present in the copolymers. The prior art binders typically are mixed with suitable acid catalysts for the crosslinking monomer. The present invention does not make use of such acid catalyzed crosslinking but rather utilizes the hydrogen bonding effect of the polyvinyl alcohol onto which the vinyl acetate and ethylene monomers are believed to be grafted. If an N-methylol functional monomer is included in the vinyl acetate-ethylene copolymer recipe, acid catalyzed crosslinking can be effected.

The starting fiber layer or mass can be formed by any one of the conventional techniques for depositing or arranging fibers in a web or layer. These techniques include cardin, garnetting, air-laying and the like. Individual webs or thin layers formed by one or more of these techniques can also be laminated to provide a thicker layer for conversion into a fabric. Typically, the fibers extend in a plurality of diverse directions in general alignment with the major plane of the fabric, overlapping, intersecting and supporting one another to form an open, porous structure.

When reference is made to "cellulose" fibers, those fibers containing predominantly $C_6H_{10}O_5$ groupings are met. Thus, examples of the fibers to be used in the starting layer are the natural cellulose fibers such as wood pulp, cotton and hemp and the synthetic cellulose fibers such as rayon, and regenerated cellulose. Often the fiber starting layer contains at least 50% cellulose fibers, whether they be natural or synthetic, or a combination thereof. Often the fibers in the starting layer may comprise natural fiber such as wool, jute; artificial fibers such as cellulose acetate; synthetic fibers such as polyamides, nylon, polyesters, acrylics, polyolefins, i.e. polyethylene, polyvinyl chloride, polyurethane, and the like, alone or in combination with one another.

The fibrous starting layer is subjected to at least one of several types of bonding operations to anchor the individual fibers together to form a self-sustaining web. Some of the better known methods of bonding are overall impregnation, or printing the web with intermittent or continuous straight or wavy lines or areas of binder extending generally transversely or diagonally across the web and additionally, if desired, along the web.

The amount of binder, calculated on a dry basis, applied to the fibrous starting web is that amount which is at least sufficient to bind the fibers together to form a self-sustaining web and suitably ranges from about 3 to about 100% or more by weight of the starting web, preferably from about 10 to about 50 wt % of the starting web. The impregnated web is then dried and cured. Thus the fabrics are suitably dried by passing them through an air oven or the like and then through a curing oven. Typical conditions to achieve optimal cross-linking are sufficient time and temperature such as drying at 150°-200° F. (66°-93° C.) for 4-6 minutes, following by curing at 300°-310° F. (149°-154° C.) for 3-5 minutes more. However, other time-temperature relationships can be employed as is well known in the art, shorter times and higher temperature or longer times at lower temperaturDes being used. Nonwoven products, especially medical-surgical fabrics, prepared in accordance with this invention have toughness and increased softness.

In the following examples, hand or "softness" was determined using the following test which measured a combination of the resistances due to flexural rigidity and surface friction in a fabric.

The hand was measured by a method utilizing a Thwing-Albert Handle-O-Meter in which the lower the number, the softer the hand.

The resistances due to surface friction and flexural rigidity of a specimen are measured as the force required by a blade forcing the specimen a set distance into a slot of parallel edges. The hand was considered to be the average of four readings taken on both sides and in both directions (machine and cross-machine directions) of the specimen and was reported in grams per standard with a specimen.

Samples to be tested were conditioned at 72° F. (23° C.) and 50% relative humidity for at least 12 hours prior to test. Specimens 3×3 inches were cut so that one side was perpendicular to the machine direction and one side was parallel. After calibrating the Handle-O-Meter, the test specimens were evaluated and the value of hand was considered to be the average of readings taken on both sides and in both directions.

EXAMPLE 1

A 10% aqueous solution (876 g) of VINOL 203 polyvinyl alcohol, which is a partially hydrolyzed (87 mole %) polyvinyl alcohol having an average degree of polymerization of 220 such that its viscosity in a 20, 10 and 4% aqueous solutions are 194, 17 and 3 cps, respectively, was mixed with deionized water (350 g), acetic acid (10 g), ferrous sulfate (0.1 g) and vinyl acetate (304 g) in a 1-gallon stainless steel high pressure reactor. VINOL 203 polyvinyl alcohol is manufactured by Air Products and Chemicals, Inc. The pH of the aqueous phase was 3–4. This premix was purged with nitrogen gas by three successive pressurizations while mixing at 100 rpm agitation. An aqueous solution of a sodium bisulfite-acetone adduct (15 ml of 8.5 wt %) was added. The contents were heated to 52° C., agitated at 800–1000 rpm, and pressurized with ethylene to 1000 psig (69 atm). After equilibrium was reached, an aqueous solution of t-butyl hydroperoxide (1% by weight) was added at a rate of 0.4 ml/min. to initiate the copolymerization. Once initiated, the t-butyl hydroperoxide and sodium bisulfite-acetone adduct solutions were added continuously to maintain the polymerization reaction. Additional vinyl acetate (911 g) was added continuously at a rate of 5.4 ml/min. to the polymerizing emulsion over a 3 hr. period. During this time, the percent of unreacted vinyl acetate concentration was maintained at 8–10% of the emulsion mixture by controlling the delivery rates of the oxidant and reductant. The running temperature was 50°–52° C. At the completion of the vinyl acetate continuous addition, the ethylene pressure was increased in the reactor to 1400 psig (96 atm). The percent unreacted vinyl acetate concentration in the emulsion decayed to 1.5% in 1.5 hr by the continued addition of the oxidant and adduct solutions. The reaction contents were transferred to a secondary vessel where ethylene was stripped away from the mixture. Defoamer (2 g in 10 ml of water) was added followed by 10–15 ml each of a 5% t-butyl hydroperoxide and sodium bisulfite-acetone solutions.

The finished product had the following physical properties:

| | |
|---|---|
| % Vinyl Acetate | 0.73 |
| pH | 4.75 |
| % Solids | 49.5 |
| Accelerated Sedimentation | 2% |
| Grits | 43 ppm |
| Brookfield Viscosity at 60 rpm | 123 cps |

Table 1 shows the softness data generated from chromatography paper containing binder add-on of 42% for the binder emulsion of Example 1 and vinyl acetate-ethylene comparative examples A and B prepared using polyvinyl alcohol having a higher degree of polymerization. In comparative Example A all the vinyl acetate was added initially while in comparative Example B 75% of the vinyl acetate was delayed into the polymerization reaction. It can be seen from the data on the softness in Table 1 that the use of a low molecular weight polyvinyl alcohol surprisingly and significantly improved the softness of the bonded chromatography paper.

TABLE 1

| | | | SOFTNESS (g) | | |
|---|---|---|---|---|---|
| BINDER | STABILIZER | Tg (°C.) | MACHINE DIRECTION | CROSS DIRECTION | AVERAGE SOFTNESS |
| Example 1 | Vinol 203 | −19 | 107 | 68 | 87 |
| Comparative A | Vinol 205/523* | −32.5 | 128 | 92 | 110 |
| Comparative B | Vinol 205 | −22 | 124 | 85 | 104 |

*VINOL 205 is a 87-89 mole % hydrolyzed PVOH having a 550 degree of polymerization and VINOL 523 is a 87-89 mole % hydrolyzed PVOH having a 1400 degree of polymerization, both marketed by Air Products and Chemicals, Inc.

EXAMPLE 2

The procedure for Example 1 was followed except that the emulsion premix contained 720 g of a 10% aqueous solution of VINOL 203 polyvinyl alcohol, as described above, and 497 g of deionized water. The vinyl acetate (911 g) was continuously added at 4.1 ml/min. over 4 hours. The percent unreacted vinyl acetate was maintained at 4–6% during this addition. The ethylene pressure was raised to 1200 psig (83 atm) at about ½ hr from initiation and 1400 psig (96 atm) at 1 hr. from initiation. The physical properties of the resulting emulsion were the following:

| | |
|---|---|
| % Vinyl Acetate | 0.7 |
| pH | 5.36 |
| % Solids | 50.4 |
| Accelerated Sedimentation | 4% |
| Grits | 221 ppm |
| Brookfield Viscosity at 60 rpm | 780 cps |

EXAMPLE 3

The procedure for Example 1 was followed except that the oxidizing agent for the polymerization was hydrogen peroxide (0.4% by weight) and the reducing agent was sodium formaldehyde sulfoxylate (10% by weight). The percent unreacted vinyl acetate was maintained at 6–8% during the addition of vinyl acetate. The physical properties of the resulting emulsion were the following:

| % Vinyl Acetate | 0.5 |
| --- | --- |
| pH | 3.4 |
| % Solids | 52.1 |
| Accelerated Sedimentation | 1.5% |
| Grits | 26 ppm |
| Brookfield Viscosity at 60 rpm | 93 cps |

It was found that this emulsion afforded better compatibility with additives in medical-surgical binder formulations.

Table 2 shows the performance results a cellulose/polyester web bonded with the vinyl acetate-ethylene copolymers of Examples 1, 2 and 3.

TABLE 2

| PROPERTY | EXAMPLE 1 | EXAMPLE 2 | EXAMPLE 3 |
| --- | --- | --- | --- |
| % Binder Add-on | 32.1 | 32.7 | 33.9 |
| Peak Tensile (pli) MD/CD | 10.9/7.2 | 8.9/5.7 | 11.7/7.6 |
| Peak Strain (%) MD/CD | 23.3/26.9 | 17.7/21.1 | 21.2/28.4 |
| Break Toughness (g-cm/cm$^2$) MD/CD | 396/304 | 396/320 | 393/365 |
| Mullen Burst (psi) Strength | 27 | 25 | 28 |
| Handle-o-Meter (g) Softness MD/CD | 26/17 | 25/18 | 32/23 |
| Elmendorf Tear (g) MD/CD | 193/285 | 156/239 | — |
| Trapezoid Tear (g) MD/CD | 481/689 | 499/680 | 435/635 |

MD = machine direction
CD = cross-machine direction

STATEMENT OF INDUSTRIAL APPLICATION

The invention provides vinyl acetate-copolymer emulsion binders which imbue nonwoven products bonded with such binders with toughness and increased softness.

I claim:

1. A vinyl acetate-ethylene copolymer binder emulsion for nonwoven products comprising an aqueous colloidal dispersion of a copolymer containing 50 to 80 wt % vinyl acetate and 20 to 50 wt % ethylene, based on monomers, prepared by the emulsion polymerization of the vinyl acetate and ethylene monomers in the presence of a stabilizingly effective amount of a stabilizing composition consisting essentially of a polyvinyl alcohol which is 50 to 99 mole % hydrolyzed and has about a 100 to 375 degree of polymerization.

2. The emulsion of claim 1 in which the polyvinyl alcohol is 85–90 mole % hydrolyzed.

3. The emulsion of claim 1 in which the polyvinyl alcohol has about a 185–255 degree of polymerization.

4. The emulsion of claim 1 in which the amount of polyvinyl alcohol is 3–10 wt % based on vinyl acetate monomer.

5. The emulsion of claim 1 in which the copolymer is 60–70 wt % vinyl acetate and 30–40 wt % ethylene.

6. The emulsion of claim 1 which the vinyl acetate-ethylene copolymer also contains up to 10 wt % of a comonomer which is a $C_3$–$C_{10}$ alkenoic acid or its ester with a $C_1$–$C_{18}$ alkanol; a vinyl halide; an alpha, beta-unsaturated $C_4$–$C_{10}$ alkenedioic acid or its monoester or diester with a $C_1$–$C_{18}$ alkanol; acrylonitrile; acrylamide; methacrylamide; N-methylol acrylamide; N-methylol methacrylamide; N-methylol allylcarbamate; lower alkyl esters of N-methylol acrylamide, N-methylol methacrylamide and N-methylol allylcarbamate; and lower alkanoic acid esters of N-methylol acrylamide, N-methylol methacrylamide and N-methylol allylcarbamate.

7. In a vinyl acetate-ethylene copolymer emulsion prepared by the aqueous emulsion polymerization of vinyl acetate and ethylene in the presence of a polyvinyl alcohol, the improvement for providing a copolymer binder emulsion that affords bonded nonwoven products having increased softness which comprises copolymerizing the vinyl acetate and ethylene monomers in a ratio to provide a copolymer containing 50–80 wt % vinyl acetate and 20–50 wt % ethylene, based on monomers, in the presence of a stabilizingly effective amount of a stabilizing composition consisting essentially of a polyvinyl alcohol which is 85–90 mole % hydrolyzed and has about a 100–375 degree of polymerization.

8. The emulsion of claim 7 in which the polyvinyl alcohol has about a 185–255 degree of polymerization.

9. The emulsion of claim 8 in which the polyvinyl alcohol is present in an amount from 3–10 wt % based on vinyl acetate.

10. The emulsion of claim 9 in which the copolymer is 60–70 wt % vinyl acetate and 30–40 wt % ethylene.

11. The emulsion of claim 10 in which the polyvinyl alcohol is 87–89 mole % hydrolyzed.

12. A nonwoven product comprising a nonwoven web of fibers bonded together with a vinyl acetate-ethylene copolymer deposited from the emulsion of claim 1 at a binder add-on sufficient to bind the fibers together to form a self-sustaining web.

13. A nonwoven product comprising a nonwoven web of fibers bonded together with a vinyl acetate-ethylene copolymer deposited from the emulsion of claim 2 at a binder add-on sufficient to bind the fibers together to form a self-sustaining web.

14. A nonwoven product comprising a nonwoven web of fibers bonded together with a vinyl acetate-ethylene copolymer deposited from the emulsion of claim 3 at a binder add-on sufficient to bind the fibers together to form a self-sustaining web.

15. A nonwoven product comprising a nonwoven web of fibers bonded together with a vinyl acetate-ethylene copolymer deposited from the emulsion of claim 4 at a binder add-on sufficient to bind the fibers together to form a self-sustaining web.

16. A nonwoven product comprising a nonwoven web of fibers bonded together with a vinyl acetate-ethylene copolymer deposited from the emulsion of claim 5 at a binder add-on sufficient to bind the fibers together to form a self-sustaining web.

17. A nonwoven product comprising a nonwoven web of fibers bonded together with a vinyl acetate-ethylene copolymer deposited from the emulsion of claim 6 at a binder add-on sufficient to bind the fibers together to form a self-sustaining web.

18. A nonwoven product comprising a nonwoven web of fibers bonded together with a vinyl acetate-ethylene copolymer deposited from the emulsion of claim 7 at a binder add-on sufficient to bind the fibers together to form a self-sustaining web.

19. A nonwoven product comprising a nonwoven web of fibers bonded together with a vinyl acetate-ethylene copolymer deposited from the emulsion of claim 8 at a binder add-on sufficient to bind the fibers together to form a self-sustaining web.

20. A nonwoven product comprising a nonwoven web of fibers bonded together with a vinyl acetate-ethylene copolymer deposited from the emulsion of claim 9 at a binder add-on sufficient to bind the fibers together to form a self-sustaining web.

21. A nonwoven product comprising a nonwoven web of fibers bonded together with a vinyl acetate-ethylene copolymer deposited from the emulsion of claim 10 at a binder add-on sufficient to bind the fibers together to form a self-sustaining web.

22. A nonwoven product comprising a nonwoven web of fibers bonded together with a vinyl acetate-ethylene copolymer deposited from the emulsion of claim 11 at a binder add-on sufficient to bind the fibers together to form a self-sustaining web.

* * * * *